(12) United States Patent
Kim

(10) Patent No.: US 12,599,852 B2
(45) Date of Patent: Apr. 14, 2026

(54) FILTRATION DEVICE

(71) Applicant: SSENG CO., LTD., Busan (KR)

(72) Inventor: Kyu Tae Kim, Busan (KR)

(73) Assignee: SSENG CO., LTD., Busan (KR)

( * ) Notice: Subject to any disclaimer, the term of this patent is extended or adjusted under 35 U.S.C. 154(b) by 413 days.

(21) Appl. No.: 18/275,021

(22) PCT Filed: Jan. 26, 2022

(86) PCT No.: PCT/KR2022/001364
§ 371 (c)(1),
(2) Date: Jul. 31, 2023

(87) PCT Pub. No.: WO2022/169180
PCT Pub. Date: Aug. 11, 2022

(65) Prior Publication Data
US 2023/0415075 A1      Dec. 28, 2023

(30) Foreign Application Priority Data

Feb. 8, 2021      (KR) ........................ 10-2021-0017600

(51) Int. Cl.
B01D 24/10           (2006.01)
B01D 29/60           (2006.01)
(52) U.S. Cl.
CPC ............. B01D 24/10 (2013.01); B01D 29/60 (2013.01)
(58) Field of Classification Search
CPC ....... B01D 24/10; B01D 29/60; B01D 29/824
See application file for complete search history.

(56) References Cited

U.S. PATENT DOCUMENTS

2001/0047962 A1      12/2001   Zha et al.
2008/0035536 A1*      2/2008   Kang ................... B01D 29/661
                                                                     210/86

FOREIGN PATENT DOCUMENTS

KR          20-0340528 Y1      2/2004
KR      10-2014-0147337 A      12/2014
KR      10-2018-0033730 A      4/2018

OTHER PUBLICATIONS

International Search Report dated May 9, 2022, issued in International Patent Application No. PCT/KR2022/001364.

(Continued)

*Primary Examiner* — Patrick Orme
(74) *Attorney, Agent, or Firm* — PnK IP LLC

(57)          ABSTRACT
A filtration device includes: a filtration tank having a raw water inlet pipe and a backwash water discharge pipe connected to an upper portion thereof, and a treated water discharge pipe, a backwash water inlet pipe, and a backwash air inlet pipe connected to a lower portion thereof; a strainer provided in the filtration tank and having a plurality of water passage holes formed on a side surface thereof and a lower side in communication with the treated water discharge pipe; a filtration unit including a fiber filter medium forming a filtration pore layer on the outer circumferential surface of the strainer, an upper support portion coupled to an upper side of the fiber filter medium, and a lower support portion coupled to a lower side of the fiber filter medium; and a filtration control unit having a cylinder disposed inside the strainer and a piston elevating from the cylinder and controlling the porosity of the fiber filter medium by compressing or relaxing the fiber filter medium with respect to the strainer while the upper support portion is elevated or lowered according to the elevating and lowering of the piston.

20 Claims, 4 Drawing Sheets

(56)                 References Cited

OTHER PUBLICATIONS

Written Opinion dated May 9, 2022, issued in International Patent
Application No. PCT/KR2022/001364.

\* cited by examiner (a)

(b)

FILTRATION DEVICE

CROSS REFERENCE TO RELATED APPLICATION

This application is a National Stage Entry of International Patent Application No. PCT/KR2022/001364, filed on Jan. 26, 2022, which claims priority from and the benefit of Korean Patent Application No. 10-2021-0017600, filed on Feb. 8, 2021, each of which is hereby incorporated by reference for all purposes as if fully set forth herein

BACKGROUND

Field

The present invention relates to a filtration device.

Discussion of Background

In general, a filtration device is a device that discharges clean treated water by filtering contaminated raw water with a filter, and is gradually increasing in size for filtering large streams or filtering factory wastewater.

A representative example of the filtration device used for this is a pore-controllable fiber filter (PCF Filter). The pore-controllable fiber filter uses fiber yarns having fine filaments bundled in a bundle and arranged in the path of flowing water as a filtration material, which is referred to as a "fiber filter medium".

The fiber filter medium not only has excellent filtration performance because pores formed by the filaments are easily adjusted by physical control, but also has an advantage of having a long lifespan because of easy cleaning. In particular, it is proved that the fiber filter medium has an excellent effect on removal efficiency for each particle size, removal efficiency of SS and BOD, and the like compared to other filtration methods.

In a conventional PCF filter, a cylinder that compresses and relaxes the fiber filter medium is usually positioned on an outer upper portion of the filter, but when the filter is installed in a space with limited height or area, such as a building or a container, a height of the filter layer is lowered by a height of the cylinder, thereby decreasing the processing capacity.

In addition, in order to disassemble and assemble the filtration device, the filtration device is mainly manufactured with an outer cylinder divided flange structure. In case of using a flat plate packing with a flat plate structure for the flange, water leakage may occur when pressure inside the filtration device rises above a certain level. In case of O-ring packing by processing grooves in the flange, there is no leakage, but it has a disadvantage that processing costs are high. In addition, an excess door installed to facilitate a task of exchanging filtration materials also uses a flat plate flange similar to the outer cylinder divided flange, and this also has problems such as water leakage when the pressure inside the filtration device rises above a certain level.

SUMMARY

The present invention is directed to providing a filtration device with improved space efficiency and airtightness performance to solve the problems described above.

Technical problems of the present invention are not limited to the aforementioned technical problems, and other technical problems, which are not mentioned above, may be clearly understood by those skilled in the art from the following descriptions.

One aspect of the present invention provides a filtration device. The device includes a filtration tank having a raw water inlet pipe and a backwash water discharge pipe connected to an upper portion thereof, and a treated water discharge pipe, a backwash water inlet pipe, and a backwash air inlet pipe connected to a lower portion thereof, a strainer provided in the filtration tank, having a plurality of water passage holes formed on a side surface thereof, and having a lower side in communication with the treated water discharge pipe, a filtration unit including a fiber filter medium forming a filtration pore layer on an outer circumferential surface of the strainer, an upper support portion coupled to an upper side of the fiber filter medium, and a lower support portion coupled to a lower side of the fiber filter medium, and a filtration control unit having a cylinder disposed inside the strainer and a piston elevating or lowering from the cylinder and configured to control the porosity of the fiber filter medium by compressing or relaxing the fiber filter medium with respect to the strainer while the upper support portion is elevated or lowered according to the elevating and lowering of the piston.

In addition, a receiving space recessed downward to receive the cylinder may be formed on an upper side of the strainer, and an open surface of the receiving space may be shielded by a sealing plate coupled to an upper end of the strainer.

In addition, a rod of the piston may be fixedly coupled to an upper portion of the filtration tank, and the cylinder may be coupled to the upper support portion such that the upper support portion may be elevated or lowered by the cylinder that is relatively elevated or lowered by the piston.

In addition, the rod of the piston may be fixedly coupled to the upper portion of the filtration tank, and the cylinder may be coupled to the second portion strainer such that the second portion strainer and the upper support portion supported by the second portion strainer may be elevated or lowered by the cylinder that is relatively elevated or lowered by the piston.

In addition, the strainer may include a first portion strainer and the second portion strainer configured to elevate or lower on an upper side of the first portion strainer to change an overall length of the strainer, and the second portion strainer may be coupled to the piston and elevated or lowered in conjunction with the elevating or lowering of the piston.

In addition, the filtration tank may include an upper housing, at least one intermediate housing, and a lower housing, wherein a first coupling structure may be applied to a lower end of the upper housing and a lower end of the intermediate housing, a second coupling structure may be applied to an upper end of the lower housing and an upper end of the intermediate housing, and the filtration tank may be assembled by coupling between the first coupling structure and the second coupling structure.

In addition, the first coupling structure may include a first protrusion portion protruding to a lower side, the second coupling structure may include a first recessed portion formed to be bent to surround the first protrusion portion, a first sealing portion made of an elastic material may be provided between the first protrusion portion and the first recessed portion, and the airtightness of the filtration tank may be maintained by a tight fit of the first protrusion portion and the first recessed portion.

In addition, the first coupling structure may further include an upper fastening portion formed to extend from one surface of the first protrusion portion, the second coupling structure may further include a lower fastening portion formed to extend from one surface of the first recessed portion, and at least one first thread member may be screw-coupled through the upper fastening portion and the lower fastening portion.

In addition, the filtration tank may include a filtration tank main body having an open area formed on one surface thereof and a filtration tank door coupled to the filtration tank main body to seal the open area, the filtration tank main body may have a second protrusion portion formed along the periphery of the open area to face the filtration tank door, the filtration tank door may have a second recessed portion formed to be bent to surround the second protrusion portion, a second sealing portion made of an elastic material may be provided between the second protrusion portion and the second recessed portion, and the airtightness of the filtration tank may be maintained by a tight fit of the second protrusion portion and the second recessed portion.

In addition, a door fastening portion may be formed to extend from one surface of the second recessed portion, and at least one second thread member may be screw-coupled to the filtration tank main body through the door fastening portion.

Another aspect of the present invention provides a filtration system. The system includes the filtration device according to an embodiment of the present invention, and a line mixer configured to mix a flocculent with raw water entering a raw water pipe connected to a front end of the line mixer, and connected to the filtration device through a raw water inlet pipe connected to a rear end of the line mixer, wherein the filtration device may be configured in plural, and may be connected in parallel to the rear end of the line mixer.

Still another aspect of the present invention provides a filtration device. The device includes a filtration tank having a raw water inlet pipe and a backwash water discharge pipe connected to an upper portion thereof, and a treated water discharge pipe, a backwash water inlet pipe, and a backwash air inlet pipe connected to a lower portion thereof, wherein the filtration tank may include an upper housing, at least one intermediate housing, and a lower housing, wherein a first coupling structure may be applied to a lower end of the upper housing and a lower end of the intermediate housing, a second coupling structure may be applied to an upper end of the lower housing and an upper end of the intermediate housing, and the filtration tank may be assembled by coupling between the first coupling structure and the second coupling structure.

In addition, the first coupling structure may include a first protrusion portion protruding to a lower side, the second coupling structure may include a first recessed portion formed to be bent to surround the protrusion portion, a first sealing portion made of an elastic material may be provided between the first protrusion portion and the first recessed portion, and the airtightness of the filtration tank may be maintained by a tight fit of the protrusion portion and the recessed portion.

In addition, the first coupling structure may further include an upper fastening portion formed to extend from one surface of the first protrusion portion, the second coupling structure may further include a lower fastening portion formed to extend from one surface of the first recessed portion portion, and at least one first thread member may be screw-coupled through the upper fastening portion and the lower fastening portion.

The filtration device may include at least one of: a strainer provided in the filtration tank and having a plurality of water passage holes formed on a side surface thereof and a lower side in communication with the treated water discharge pipe; a filtration unit including a fiber filter medium forming a filtration pore layer on an outer circumferential surface of the strainer, an upper support portion coupled to an upper side of the fiber filter medium, and a lower support portion coupled to a lower side of the fiber filter medium; and a filtration control unit having a cylinder and a piston elevating or lowering from the cylinder and configured to control the porosity of the fiber filter medium by compressing or relaxing the fiber filter medium with respect to the strainer while the upper support portion is elevated or lowered according to the elevating and lowering of the piston.

Yet another aspect of the present invention provides a filtration device. The device includes a filtration tank main body having an open area formed on one surface thereof, and a filtration tank door coupled to the filtration tank main body to seal the open area, wherein the filtration tank main body may have a second protrusion portion formed along the periphery of the open area to face the filtration tank door, the filtration tank door may have a second recessed portion formed to be bent to surround the second protrusion portion, a second sealing portion made of an elastic material may be provided between the second protrusion portion and the recessed portion, and the airtightness of the filtration tank may be maintained by a tight fit of the second protrusion portion and the second recessed portion.

In addition, a door fastening portion may be formed to extend from one surface of the second recessed portion, and at least one second thread member may be screw-coupled to the filtration tank main body through the door fastening portion.

The filtration device may include at least one of: a strainer provided in the filtration tank and having a plurality of water passage holes formed on a side surface thereof and a lower side in communication with the treated water discharge pipe; a filtration unit including a fiber filter medium forming a filtration pore layer on an outer circumferential surface of the strainer, an upper support portion coupled to an upper side of the fiber filter medium, and a lower support portion coupled to a lower side of the fiber filter medium; and a filtration control unit having a cylinder and a piston elevating or lowering from the cylinder and configured to control the porosity of the fiber filter medium by compressing or relaxing the fiber filter medium with respect to the strainer while the upper support portion is elevated or lowered according to the elevating and lowering of the piston.

According to the present invention, a filtration control unit having a piston configured to elevate or lower for compressing and relaxing a fiber filter medium is positioned inside a strainer, so that it is not necessary to provide a separate space for the disposition of the filtration control unit at an upper end of a filtration tank or the like, and the height of a filtration layer can be increased. Therefore, it is possible to provide improved filtration efficiency by increasing a treated water volume by increasing a filtration area within a limited space or increasing treatment performance.

In addition, according to the present invention, a flange-type coupling structure between an upper, intermediate, and lower housings of a filtration tank can be changed to a gutter-O-ring coupling structure to increase airtightness and prevent water leakage.

In addition, according to the present invention, the filtration tank is formed with a combination of an upper housing, at least one intermediate housing, and a lower housing, in which the number of intermediate housings is adjusted, so that the size and filtration capacity of the entire filtration tank can be adjusted. In particular, the same coupling structure is applied to each housing, so that it is easy to assemble and interchangeable between housings, which can shorten the production period when inventory is held by planned production.

In addition, according to the present invention, the air-tightness performance of the filtration tank can be improved by applying a more improved coupling structure between a filtration tank main body and a filtration tank door.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

The brief description of the drawings is provided to more sufficiently understand the drawings recited in the detailed description of the present invention.

DETAILED DESCRIPTION

Figure 1:
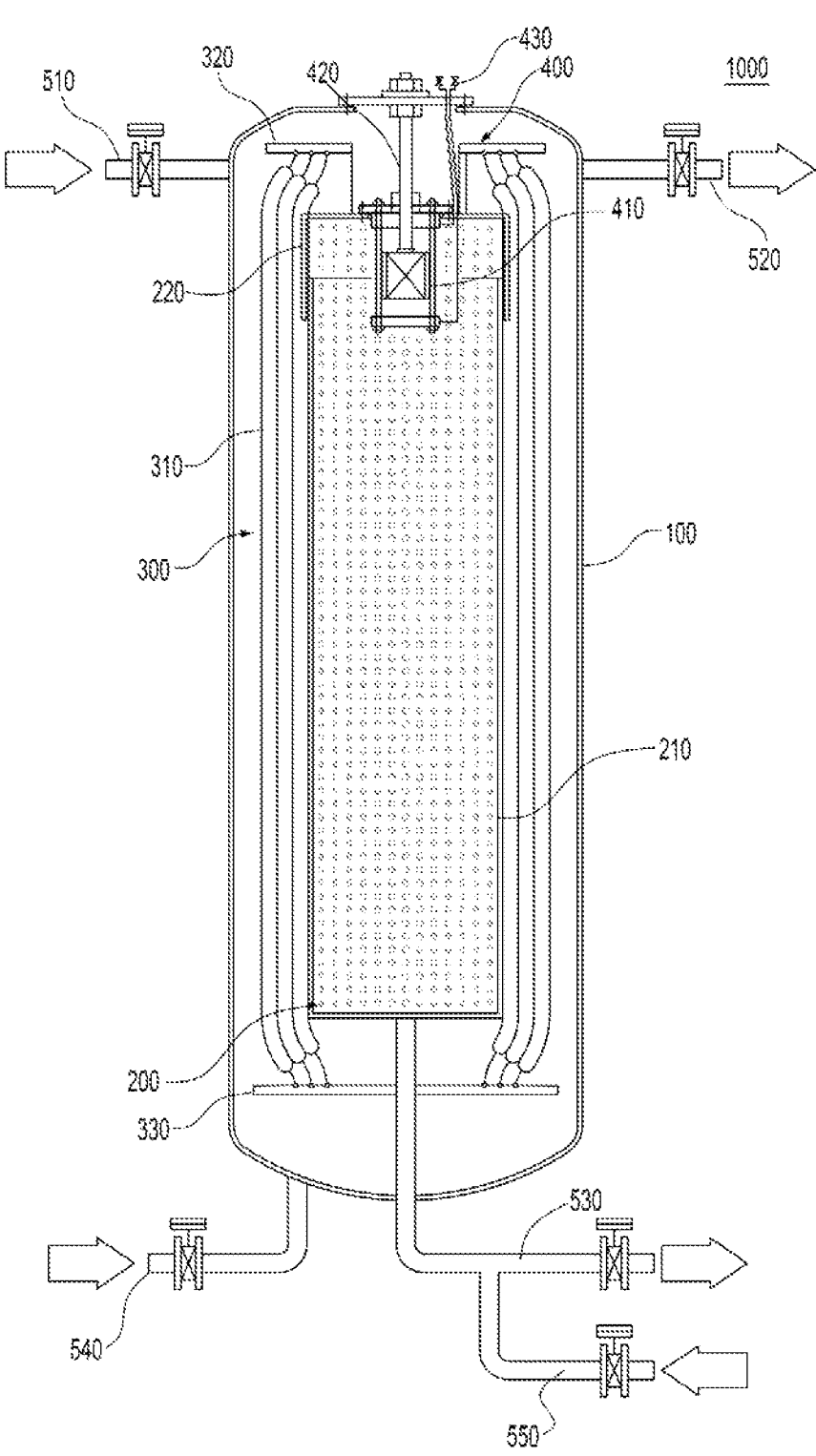
FIG. 1 is a partial cut-away view of a filtration device according to an embodiment of the present invention.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, an exemplary embodiment according to the present invention will be described in detail with reference to the accompanying drawings. In addition, a method of constituting and using the embodiment of the present invention will be described in detail with reference to the accompanying drawings. The same reference numerals or symbols presented in each drawing represent parts or constituent elements that perform substantially the same function. Hereinafter, for convenience of description, the upward, downward, leftward, and rightward directions are based on the drawings and the present invention is not necessarily limited to those corresponding directions.

The terms including ordinal numbers such as "first," "second," and the like may be used to describe various constituent elements, but the constituent elements are not limited by the terms. These terms are used only to distinguish one constituent element from another constituent element. For example, a first constituent element may be named a second constituent element, and similarly, the second constituent element may also be named the first constituent element, without departing from the scope of the present invention. The term "and/or" includes any one item or combinations of a plurality of the related items.

The terms used in the present specification are used for the purpose of describing embodiments and are not intended to limit and/or restrict the present invention. Singular expressions include plural expressions unless clearly described as different meanings in the context. In the present specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

Throughout the present specification, when one constituent element is referred to as being connected to another constituent element, one constituent element can be directly connected to the other constituent element, and one constituent element can also be indirectly connected to the other element with other elements therebetween. In addition, unless explicitly described to the contrary, the word "comprise/include" and variations such as "comprises/includes" or "comprising/including" will be understood to imply the inclusion of stated elements, not the exclusion of any other elements.

FIG. 1 is a partial cut-away view of a filtration device according to an embodiment of the present invention.

With reference to FIG. 1, a filtration device 1000 may include a filtration tank 100, a strainer 200, a filtration unit 300, and a filtration control unit 400.

The filtration tank 100 may be in fluidic communication with the outside and receive the strainer 200, the filtration unit 300, and the filtration control unit 400 therein. The filtration tank 100 may have a raw water inlet pipe 510 and a backwash water discharge pipe 520 connected to an upper portion, and a treated water discharge pipe 530, a backwash water inlet pipe 550, and a backwash air inlet pipe 540 connected to a lower portion.

Specifically, in a filtration process, raw water may be introduced into the filtration tank 100 through the raw water inlet pipe 510, filtered through the filtration unit 300 and the strainer 200, and discharged through the treated water discharge pipe 530. In addition, during a backwashing process, treated water may be introduced into the filtration tank 100 from the backwash water inlet pipe 550 and discharged to the backwash water discharge pipe through the strainer 200 and the filtration unit 300. In this case, air is introduced into the filtration tank 100 from the backwash air inlet pipe 540, which may improve backwash efficiency.

The strainer 200 may be provided within the filtration tank 100 and may be formed in a lengthwise direction of the filtration tank 100, such that a plurality of water passage holes may be formed in at least a side surface. In addition, the strainer 200 may be in communication with the treated water discharge pipe 530 and the backwash water inlet pipe 550 at a lower side. The treated water introduced through the fiber filter medium and the water passage holes may be discharged through the treated water discharge pipe 530.

In the embodiment, a receiving space may be formed in an upper side of the strainer 200 that is recessed into a lower side to receive at least a portion of the filtration control unit 400 (in particular, a cylinder 410, etc.). That is, an overall space of the filtration system may be reduced compared to a case where the filtration control unit 400 is positioned on the upper side of the filtration tank 100 by providing the filtration control unit 400 inside the strainer 200.

In the embodiment, an open surface of the receiving space may be shielded by a sealing plate that couples to an upper end of the strainer 200. The sealing plate may have a passage through which at least a portion of the filtration control unit 400 (in particular, a piston 420, etc.) may be elevated or lowered.

In the embodiment, the strainer 200 may be configured in plural. For example, the strainer 200 may include a first portion strainer 210 on a lower side and a second portion strainer 220 on an upper side of the first portion strainer 210. In this case, the first portion strainer 210 is fixedly disposed, and the second portion strainer 220 may be elevated or lowered relative to the first portion strainer 210 to vary an overall length of the strainer 200. The first portion strainer 210 and the second portion strainer 220 may be disposed to partially overlap. In particular, the second portion strainer 220 may be coupled to the piston 420 to be elevated or lowered in conjunction with elevating or lowering the piston 420.

The filtration unit 300 may be provided outside the strainer 200 to form filtration porosity, and may filter the raw water introduced into the filtration tank 100. The treated water produced by filtering the raw water may be introduced into the strainer 200.

Specifically, the filtration unit 300 may include a fiber filter medium 310, an upper support portion 320, and a lower support portion 330. The fiber filter medium 310 may form a filtration pore layer on an outer circumferential surface of the strainer 200. The upper support portion 320 is positioned on an upper side of the strainer 200 and may be coupled to an upper side of the fiber filter medium 310. The lower support portion 330 is positioned on a lower side of the strainer 200 and may be coupled to a lower side of the fiber filter medium 310. The fiber filter medium 310 may be arranged along the lengthwise direction of the strainer 200 as the fiber filter medium 310 is coupled by the upper support portion and the lower support portion.

In the embodiment, at least one of the upper support portion 320 and the lower support portion 330 may be directly or indirectly coupled to the piston 420 and/or the cylinder 410 of the filtration control unit. Therefore, at least one of the upper support portion 320 and the lower support portion 330 may be elevated or lowered in conjunction with the piston 420. For example, the piston 420 is coupled to the second portion strainer 220 and the second portion strainer 220 is coupled to the upper support portion 320 so that elevating or lowering of the piston 420 may be transmitted to the upper support portion 320 through the second portion strainer 220. In contrast, for example, the piston 420 may be coupled to the second portion strainer 220 and the upper support portion 320, so that elevating or lowering of the piston 420 may be transmitted to the second portion strainer 220 and the upper support portion 320.

The filtration control unit 400 may control the porosity of the fiber filter medium 310. Specifically, by elevating or lowering at least one of the upper support portion 320 and the lower support portion 330, the filtration porosity may be adjusted by compressing or relaxing the fiber filter medium 310 surrounding the strainer 200 may be.

For example, the filtration control unit 400 may compress the fiber filter medium 310 to form the filtration porosity by elevating the upper support portion 320 during the filtration process. In addition, for example, the control unit may relax the fiber filter medium 310 by lowering the upper support portion 320 during the backwashing process. The relaxed fiber filter medium 310 may be vigorously flowed and easily cleaned by the backwash water ejected from the strainer 200 and the backwash air rising from the bottom.

In the embodiment, the filtration control unit 400 may include the cylinder 410 disposed inside the strainer 200 and the piston 420 elevating or lowering from the cylinder 410. The cylinder 410 may be fixedly disposed in the receiving space inside the strainer 200, and the piston 420 may move upward and downward from the cylinder 410.

In the embodiment, the piston 420 may elevate or lower from the cylinder 410, but a rod of the piston 420 may be fixedly coupled to the filtration tank 100 (particularly, a cover of the filtration tank 100). Therefore, when the piston 420 is elevating or lowering, the cylinder 410 may be relatively elevating or lowering. In this case, the upper support portion and/or a portion of the strainer 200 (e.g., the second portion strainer 220) may be elevated or lowered in conjunction with the cylinder 410 by being directly or indirectly coupled to the cylinder 410 that is elevating or lowering.

In the embodiment, when the strainer 200 is configured in plural, the cylinder 410 and/or the piston 420 of the filtration control unit 400 may be coupled to one of the strainers 200, for example, the second portion strainer 220. Therefore, when the piston 420 is elevating or lowering, the second portion strainer 220 and the upper support portion 320 may be elevated or lowered simultaneously.

In the embodiment, one area of the upper portion of the filtration tank 100 is formed open, and a cover may be installed at an upper side of the open area. The filtration control unit 400 may be installed or removed through the open area. In addition, the piston 420 may be coupled and fixed to the cover.

In the embodiment, the filtration control unit 400 may further include air tubes 430. The air tubes 430 may be communicably connected to the cylinder 410 to relieve negative pressure or positive pressure within the cylinder 410. Specifically, when the piston 420 is relatively lowering within the cylinder 410, positive pressure may be generated on a lower side of the cylinder 410 and negative pressure may be generated on an upper side of the cylinder 410. Similarly, when the piston 420 is relatively elevating within the cylinder 410, negative pressure may be generated on the lower side of the cylinder 410 and positive pressure may be generated on the upper side of the cylinder 410. The air tubes 430 may be connected to the upper side and the lower side of the cylinder 410, respectively, and may be in communication with the outside to allow negative pressure or positive pressure to be relieved. This allows the piston 420 to elevate or lower smoothly while maintaining a seal between the cylinder 410 and the strainer 200.

The filtration device 1000 illustrated in FIG. 1 is exemplary, and various configurations may be employed depending on the embodiment to which the present invention is applied. In addition, not all of the constituent elements illustrated in FIG. 1 are necessary constituent elements of the filtration device 1000. According to the embodiment, the filtration device 1000 may be implemented by more constituent elements than those illustrated in FIG. 1, and by less constituent elements than those illustrated in FIG. 1.

Figure 2:
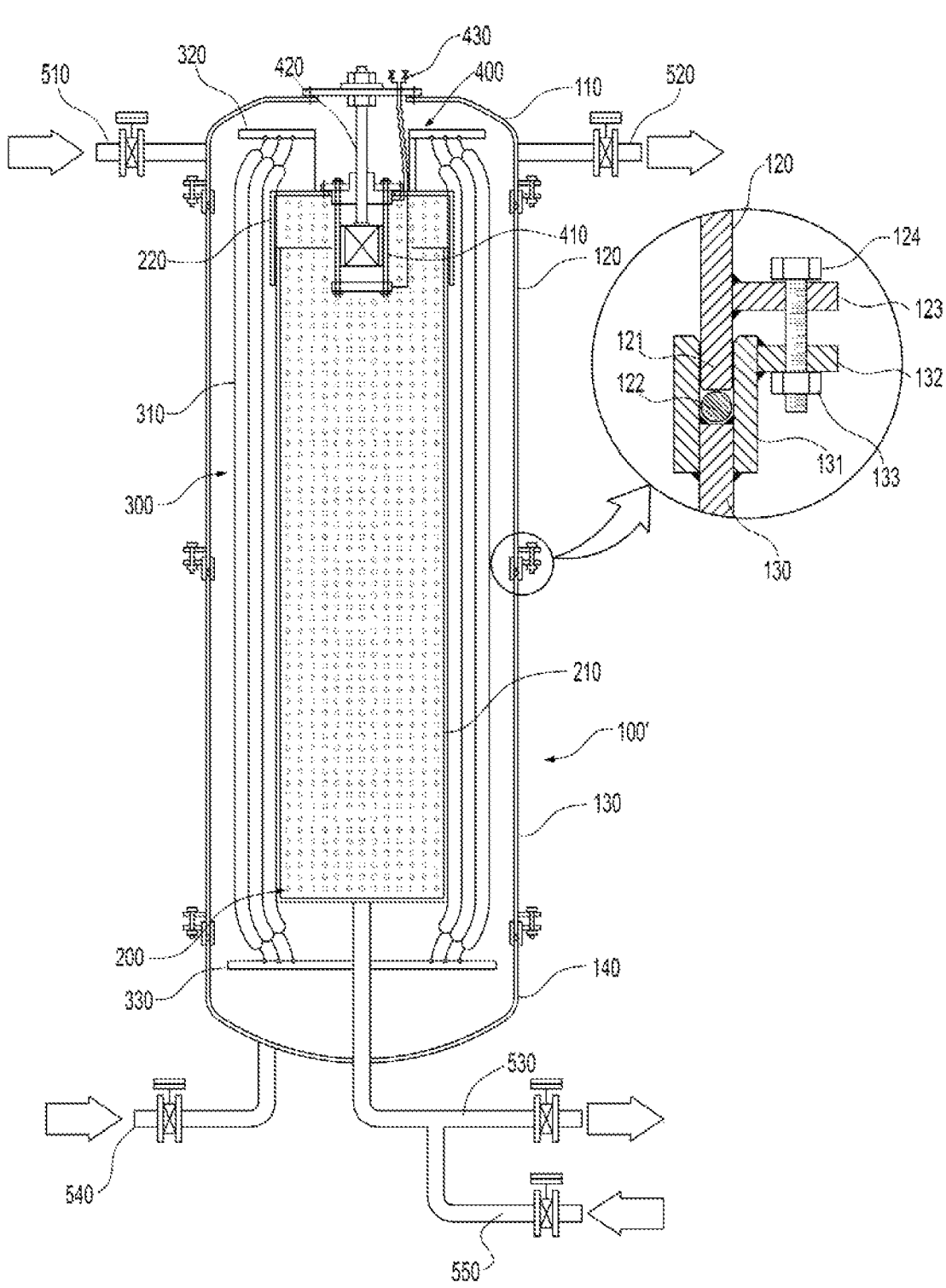
FIG. 2 is a view for describing a coupling structure between housings of a filtration tank according to the embodiment of the present invention.

FIG. 2 is a view for describing a coupling structure between housings of a filtration tank according to the embodiment of the present invention.

With reference to FIG. 2, a filtration tank 100' may include a plurality of housings 110, 120, 130, and 140. Specifically, the filtration tank 100' may include an upper housing 110, intermediate housings 120 and 130, and a lower housing 140. That is, the overall size and length of the filtration tank 100' may be easily adjusted by changing the number of intermediate housings 120 and 130.

A first coupling structure may be applied to a lower end of the housing 110 and lower ends of the intermediate housings 120 and 130, a second coupling structure may be applied to an upper end of the lower housing 140 and upper ends of the intermediate housings 120 and 130, and the filtration tank 100' may be assembled by coupling between the first coupling structure and the second coupling structure.

That is, the first coupling structure is equally applied to a lower end side of each housing 110, 120, and 130, and the second coupling structure is equally applied to an upper end side of each housing 120, 130, and 140, so that change in position or interchangeability of the housings 110, 120, 130, and 140 may be facilitated.

In the embodiment, the first coupling structure may include a first protrusion portion 121 that protrudes to a lower side. Correspondingly, the second coupling structure may include a first recessed portion 131 that is formed to be bent to surround the first protrusion portion 121. The airtightness of the filtration tank 100' may be maintained by such a tight fit of the first protrusion portion 121 and the first recessed portion 131.

Additionally, a first sealing portion 122 made of an elastic material may be provided between the first protrusion portion 121 and the first recessed portion 131. The first sealing portion 122 may be, for example, an O-ring made of an elastic material. However, the present invention is not limited thereto.

In the embodiment, the first coupling structure may further include an upper fastening portion 123 formed to extend from one surface of the first protrusion portion 121. Correspondingly, the second coupling structure may further include a lower fastening portion 132 formed to extend from one surface of the first recessed portion 131.

In this case, at least one first thread member may penetrate and may be screw-coupled to the upper fastening portion 123 and the lower fastening portion 132. For example, the first thread member may be a bolt 133, which may be assembled with a nut 124 provided on one of the upper fastening portion 123 and the lower fastening portion 132.

The filtration tank 100' illustrated in FIG. 2 is exemplary, and various configurations may be applied depending on the embodiment to which the present invention is applied. While two intermediate housings 120 and 130 are illustrated in FIG. 2, fewer or more intermediate housings may be included, depending on the embodiment. In addition, while FIG. 2 illustrates only the coupling between the intermediate housing 120 and the intermediate housing 130, the same may be applied to the coupling of other members to which the first coupling structure and the second coupling structure are applied.

Figure 3:
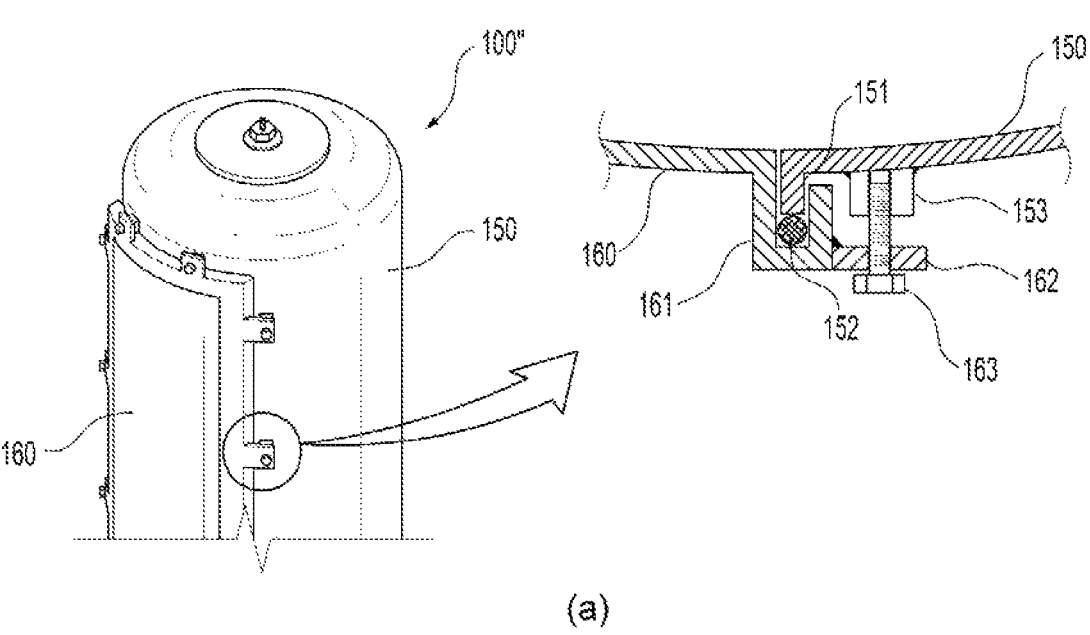
FIG. 3 is a view for describing a door of the filtration tank according to the embodiment of the present invention.
Figure 3:
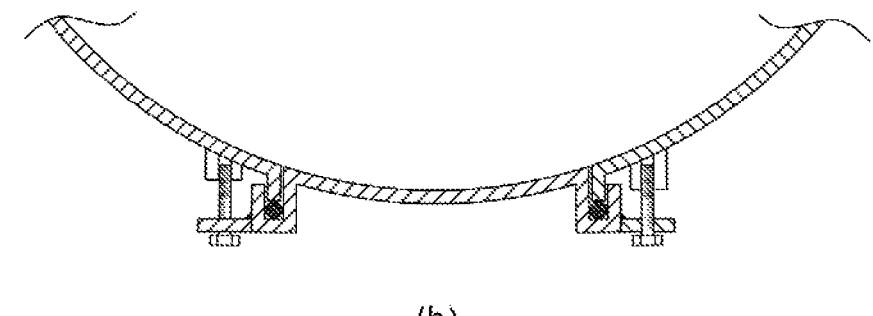

FIG. 3 is a view for describing a door of the filtration tank according to the embodiment of the present invention.

With reference to FIG. 3, a filtration tank 100" may include a filtration tank main body 150 and a filtration tank door 160.

The filtration tank main body 150 is in fluidic communication with the outside, and may form a receiving space in which a strainer 200, a filtration unit 300, and a filtration control unit 400 are received. In this case, the filtration tank main body 150 may be formed with an open area on at least one surface such that the strainer, the fiber filter medium or the like may be allowed to enter and exit. The filtration tank door 160 may open and close the open area by being coupled to the filtration tank main body 150.

In the embodiment, on the filtration tank main body 150, a second protrusion portion 151 may be formed along the periphery of the open area to face the filtration tank door 160. Correspondingly, a second recessed portion 161 that is bent to surround the second protrusion portion 151 may be formed on the filtration tank door 160. The airtightness of the filtration tank 100" may be maintained by a tight fit of the second protrusion portion 151 and the second recessed portion 161.

Additionally, a second sealing portion 152 made of an elastic material may be provided between the second protrusion portion 151 and the second recessed portion 161. The second sealing portion 152 may be, for example, an O-ring made of an elastic material. However, the present disclosure is not limited thereto.

In the embodiment, a door fastening portion 162 may be formed to extend from one surface of the second recessed portion 161. At least one second thread member may penetrate the door fastening portion 162 and may be screw-coupled to the filtration tank main body 150. For example, the second thread member may be a bolt 163, which may be assembled with a nut 153 provided on a surface of the filtration tank main body 150.

The filtration tank 100" illustrated in FIG. 3 is exemplary, and various configurations may be applied depending on the embodiment to which the present invention is applied.

Figure 4:
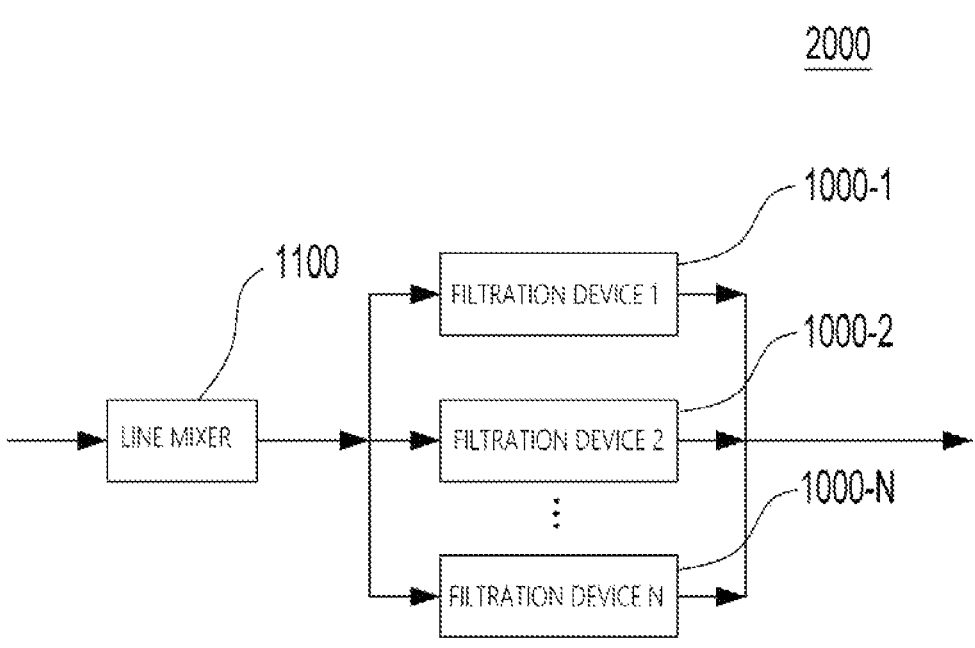
FIG. 4 is a block diagram of a filtration system according to the embodiment of the present invention.

FIG. 4 is a block diagram of a filtration system according to the embodiment of the present invention.

With reference to FIG. 4, a filtration system 2000 may include a line mixer 1100 and filtration devices 1000-1, 1000-2, and 1000-N.

The line mixer 1100 may have a front end connected to a raw water pipe and a rear end connected to the filtration devices 1000-1, 1000-2, and 1000-N through a raw water inlet pipe. When raw water is introduced from the raw water pipe, the line mixer 1100 may mix a flocculent with the raw water, and transport the raw water to the filtration devices 1000-1, 1000-2, and 1000-N at the rear end of the line mixer 1100.

That is, the flocculent is instantaneously mixed with the raw water by the line mixer 1100 to grow flocculent particles (flocs), and then filtration efficiency may be improved by allowing the filtration device 1000-1, 1000-2, and 1000-N to perform the filtration process.

Here, the line mixer 1100 is a device with partition walls formed inside a tubular body to allow multiple collisions to occur as water flows at a flow rate, such that the raw water mixed with the flocculent may pass through the line mixer 1100 and collide with the partition walls to be mixed. That is, in the line mixer 1100, as the raw water including the flocculent is rapidly mixed by the impact of colliding with the partition walls, the floc particles may grow instantaneously, and the fine fiber filter medium is capable of filtering even fine flocs with a particle diameter of about 5 um. That is, the flocculent particles may be formed rapidly and easily through the line mixer 1100, there is no need for a long maturation period in a flocculation tank to form macroparticles, and even fine particles may be filtered, allowing filtration treatment to be performed directly without a sedimentation tank. Therefore, there is no need for configurations such as a flocculation tank and sedimentation tank for mixing the flocculent in the filtration system 2000.

In addition, to this end, the filtration devices 1000-1, 1000-2, and 1000-N may be configured in plural, and directly or indirectly connected in parallel to the rear end of the line mixer 1100 and the front end of the treated water discharge pipe.

While the present invention has been described above with reference to the limited exemplary embodiments and the drawings, the present invention may be variously modified and altered from the disclosure by those skilled in the art to which the present invention pertains. For example, appropriate results may be achieved even though the described technologies are performed in different orders from the described method, the described constituent elements such as the systems, the structures, the apparatuses, and the circuits are coupled or combined in different manners from the described method, and/or the constituent elements are substituted with or replaced by other constituent elements or equivalents. In addition, each of the embodiments may be operated in combination with each other as necessary. Accordingly, other implements, other exemplary embodiments, and equivalents to the scope of claims are also included in the scope of the appended claims described below.

The invention claimed is:

1. A filtration device comprising:

a filtration tank having a raw water inlet pipe and a backwash water discharge pipe connected to an upper portion thereof, and a treated water discharge pipe, a backwash water inlet pipe, and a backwash air inlet pipe connected to a lower portion thereof;

a strainer provided in the filtration tank, having a plurality of water passage holes formed on a side surface thereof, and having a lower side in communication with the treated water discharge pipe;

a filtration unit including a fiber filter medium forming a filtration pore layer on an outer circumferential surface of the strainer, an upper support portion coupled to an upper side of the fiber filter medium, and a lower support portion coupled to a lower side of the fiber filter medium; and a filtration control unit having a cylinder disposed inside the strainer and a piston elevating or lowering from the cylinder, and configured to control the porosity of the fiber filter medium by compressing or relaxing the fiber filter medium with respect to the strainer while the upper support portion is elevated or lowered according to the elevating or lowering of the piston.

2. The filtration device of claim 1, wherein a receiving space recessed downward to receive the cylinder is formed on an upper side of the strainer, and an open surface of the receiving space is shielded by a sealing plate coupled to an upper end of the strainer.

3. The filtration device of claim 2, wherein a rod of the piston is fixedly coupled to the filtration tank, and the cylinder is coupled to the upper support portion such that the upper support portion is elevated or lowered by the cylinder that is relatively elevated or lowered by the piston.

4. The filtration device of claim 1, wherein the strainer includes a first portion strainer and a second portion strainer configured to elevate or lower on an upper side of the first portion strainer to change an overall length of the strainer, and the second portion strainer is coupled to the piston and elevated or lowered in conjunction with the elevating or lowering of the piston.

5. The filtration device of claim 4, wherein an upper side end of the piston is fixedly coupled to the filtration tank, and the cylinder is coupled to the second portion strainer such that the second portion strainer and the upper support portion supported by the second portion strainer are elevated or lowered by the cylinder that is relatively elevated or lowered by the piston.

6. The filtration device of claim 1, wherein the filtration tank includes:

an upper housing;

at least one intermediate housing; and a lower housing, wherein a first coupling structure is applied to a lower end of the upper housing and a lower end of the intermediate housing, and a second coupling structure is applied to an upper end of the lower housing and an upper end of the intermediate housing, and the filtration tank is assembled by coupling between the first coupling structure and the second coupling structure.

7. The filtration device of claim 6, wherein the first coupling structure includes a first protrusion portion protruding to a lower side, the second coupling structure includes a first recessed portion formed to be bent to surround the first protrusion portion, a first sealing portion made of an elastic material is provided between the first protrusion portion and the first recessed portion, and the airtightness of the filtration tank is maintained by a tight fit of the first protrusion portion and the first recessed portion.

8. The filtration device of claim 7, wherein the first coupling structure further includes an upper fastening portion formed to extend from one surface of the first protrusion portion, and the second coupling structure further includes a lower fastening portion formed to extend from one surface of the first recessed portion, and at least one first thread member is screw-coupled through the upper fastening portion and the lower fastening portion.

9. The filtration device of claim 1, wherein the filtration tank includes a filtration tank main body having an open area formed on one surface thereof, and a filtration tank door coupled to the filtration tank main body to seal the open area, the filtration tank main body has a second protrusion portion formed along a periphery of the open area to face the filtration tank door, the filtration tank door has a second recessed portion formed to be bent to surround the second protrusion portion, a second sealing portion made of an elastic material is provided between the second protrusion portion and the second recessed portion, and the airtightness of the filtration tank is maintained by a tight fit of the second protrusion portion and the second recessed portion.

10. The filtration device of claim 9, wherein a door fastening portion is formed to extend from one surface of the second recessed portion, and at least one second thread member is screw-coupled to the filtration tank main body through the door fastening portion.

11. A filtration system comprising:

the filtration device; and a line mixer configured to mix a flocculent with raw water entering a raw water pipe connected to a front end, and connected to the filtration device through a raw water inlet pipe connected to a rear end, wherein the filtration device is configured in plural, and connected in parallel to the rear end of the line mixer, and wherein the filtration device comprises:

a filtration tank having the raw water inlet pipe and a backwash water discharge pipe connected to an upper portion thereof, and a treated water discharge pipe, a backwash water inlet pipe, and a backwash air inlet pipe connected to a lower portion thereof;

a strainer provided in the filtration tank, having a plurality of water passage holes formed on a side surface thereof, and having a lower side in communication with the treated water discharge pipe;

a filtration unit including a fiber filter medium forming a filtration pore layer on an outer circumferential surface of the strainer, an upper support portion coupled to an upper side of the fiber filter medium, and a lower support portion coupled to a lower side of the fiber filter medium; and a filtration control unit having a cylinder disposed inside the strainer and a piston elevating or lowering from the cylinder, and configured to control the porosity of the fiber filter medium by compressing or relaxing the fiber filter medium with respect to the strainer while the upper support portion is elevated or lowered according to the elevating or lowering of the piston.

12. The filtration system of claim 11, wherein a receiving space recessed downward to receive the cylinder is formed on an upper side of the strainer, and an open surface of the receiving space is shielded by a sealing plate coupled to an upper end of the strainer.

13. The filtration system of claim 12, wherein a rod of the piston is fixedly coupled to the filtration tank, and the cylinder is coupled to the upper support portion such that the upper support portion is elevated or lowered by the cylinder that is relatively elevated or lowered by the piston.

14. The filtration system of claim 11, wherein the strainer includes a first portion strainer and a second portion strainer configured to elevate or lower on an upper side of the first portion strainer to change an overall length of the strainer, and the second portion strainer is coupled to the piston and elevated or lowered in conjunction with the elevating or lowering of the piston.

15. The filtration system of claim 14, wherein an upper side end of the piston is fixedly coupled to the filtration tank, and the cylinder is coupled to the second portion strainer such that the second portion strainer and the upper support portion supported by the second portion strainer are elevated or lowered by the cylinder that is relatively elevated or lowered by the piston.

16. The filtration system of claim 11, wherein the filtration tank includes:

an upper housing;

at least one intermediate housing; and a lower housing, wherein a first coupling structure is applied to a lower end of the upper housing and a lower end of the intermediate housing, and a second coupling structure is applied to an upper end of the lower housing and an upper end of the intermediate housing, and the filtration tank is assembled by coupling between the first coupling structure and the second coupling structure.

17. The filtration system of claim 16, wherein the first coupling structure includes a first protrusion portion protruding to a lower side, the second coupling structure includes a first recessed portion formed to be bent to surround the first protrusion portion, a first sealing portion made of an elastic material is provided between the first protrusion portion and the first recessed portion, and the airtightness of the filtration tank is maintained by a tight fit of the first protrusion portion and the first recessed portion.

18. The filtration system of claim 17, wherein the first coupling structure further includes an upper fastening portion formed to extend from one surface of the first protrusion portion, and the second coupling structure further includes a lower fastening portion formed to extend from one surface of the first recessed portion, and at least one first thread member is screw-coupled through the upper fastening portion and the lower fastening portion.

19. The filtration system of claim 11, wherein the filtration tank includes a filtration tank main body having an open area formed on one surface thereof, and a filtration tank door coupled to the filtration tank main body to seal the open area, the filtration tank main body has a second protrusion portion formed along a periphery of the open area to face the filtration tank door, the filtration tank door has a second recessed portion formed to be bent to surround the second protrusion portion, a second sealing portion made of an elastic material is provided between the second protrusion portion and the second recessed portion, and the airtightness of the filtration tank is maintained by a tight fit of the second protrusion portion and the second recessed portion.

20. The filtration system of claim 19, wherein a door fastening portion is formed to extend from one surface of the second recessed portion, and at least one second thread member is screw-coupled to the filtration tank main body through the door fastening portion.

* * * * *